United States Patent
Venter

(10) Patent No.: US 9,634,597 B2
(45) Date of Patent: Apr. 25, 2017

(54) AIRCRAFT ENGINE AND METHOD FOR OPERATING AN AIRCRAFT ENGINE

(71) Applicant: Rolls-Royce Deutschland Ltd & Co KG, Blankenfelde-Mahlow (DE)

(72) Inventor: Gideon Venter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 14/835,305

(22) Filed: Aug. 25, 2015

(65) Prior Publication Data

US 2016/0065106 A1  Mar. 3, 2016

(30) Foreign Application Priority Data

Aug. 26, 2014 (DE) .................. 10 2014 112 182

(51) Int. Cl.
| | |
|---|---|
| *H02P 9/06* | (2006.01) |
| *H02P 9/48* | (2006.01) |
| *H02K 7/116* | (2006.01) |
| *F16H 61/52* | (2006.01) |
| *F16H 61/60* | (2006.01) |

(Continued)

(52) U.S. Cl.
CPC .............. *H02P 9/06* (2013.01); *F01D 15/10* (2013.01); *F02C 7/275* (2013.01); *F02C 7/32* (2013.01); *F02C 7/36* (2013.01); *F16H 45/02* (2013.01); *F16H 61/14* (2013.01); *F16H 61/52* (2013.01); *F16H 61/60* (2013.01); *H02K 7/116* (2013.01);

(Continued)

(58) Field of Classification Search
CPC .......................................................... F02C 7/26
USPC ............................................................ 290/4 B
See application file for complete search history.

(56) References Cited

U.S. PATENT DOCUMENTS 2,932,939 A * 4/1960 Hause ..................... F16H 61/56
                                                                  60/354
3,465,162 A * 9/1969 Oprecht .................. F02C 7/277
                                                                  290/4 R (Continued)

FOREIGN PATENT DOCUMENTS

DE  102007004274   7/2008
EP       1519018   3/2005

(Continued)

OTHER PUBLICATIONS

German Search Report dated Apr. 29, 2015 for related German Appl. No. 10 2014 112 182.1.

(Continued)

*Primary Examiner* — Tulsidas C Patel
*Assistant Examiner* — Charles Reid, Jr.
(74) *Attorney, Agent, or Firm* — Shuttleworth & Ingersoll, PLC; Timothy Klima

(57) ABSTRACT

An aircraft engine includes at least one electrical apparatus, which can be driven by a driveshaft in order to generate electrical energy. A hydrodynamic torque converter, with guide blades, which can be adjusted via a mechanism, is arranged between the driveshaft and the electrical apparatus. The guide blades are adjusted as a function of a rotational speed of the driveshaft, wherein the rotational speed of a shaft of the electrical apparatus operated as a generator can be adjusted, essentially within a predefined rotational speed range, via the adjustment of the guide blades.

16 Claims, 2 Drawing Sheets

(51) Int. Cl.
*F16H 61/14* (2006.01)
*F16H 45/02* (2006.01)
*F01D 15/10* (2006.01)
*F02C 7/32* (2006.01)
*F02C 7/36* (2006.01)
*F02C 7/275* (2006.01)

(52) U.S. Cl.
CPC .......... *H02P 9/48* (2013.01); *F05D 2220/764* (2013.01); *F05D 2260/406* (2013.01)

(56) References Cited

U.S. PATENT DOCUMENTS

| | | | | |
|---|---|---|---|---|
| 3,721,090 | A * | 3/1973 | Ahlen | F16H 41/26 60/362 |
| 4,009,571 | A * | 3/1977 | Black | F16H 61/56 415/161 |
| 4,377,068 | A * | 3/1983 | Braatz | F16H 61/52 60/342 |
| 4,534,456 | A * | 8/1985 | Slezak | F01P 7/042 192/58.3 |
| 4,651,521 | A * | 3/1987 | Ossi | F01D 15/12 60/226.3 |
| 5,005,356 | A * | 4/1991 | Saunders | F16H 41/26 416/180 |
| 5,571,975 | A * | 11/1996 | Smith, Jr. | G01L 3/20 188/296 |
| 2014/0373521 | A1 * | 12/2014 | DeVita | B64D 35/00 60/336 |
| 2015/0197343 | A1 * | 7/2015 | Jaenker | B64C 27/006 244/58 |

FOREIGN PATENT DOCUMENTS

| | | | |
|---|---|---|---|
| EP | 1724455 | 11/2006 | |
| EP | 1777392 | 4/2007 | |
| GB | EP 1724455 A2 * | 11/2006 | ............. F01D 5/026 |

OTHER PUBLICATIONS

European Search Report dated Jan. 19, 2016 from counterpart European App No. 15182193.1.

* cited by examiner

AIRCRAFT ENGINE AND METHOD FOR OPERATING AN AIRCRAFT ENGINE

This application claims priority to German Patent Application DE102014112182.1 filed Aug. 26, 2014, the entirety of which is incorporated by reference herein.

The invention relates to an aircraft engine and a method for operating an aircraft engine in accordance with the type defined in more detail herein.

In aircraft known in the field, power is generated by various electrical components. Small aircraft use direct current generators or alternating current generators. In contrast, wide-bodied aircraft are operated with alternating current generators, which typically generate 115 volts at 400 hertz. Compared to the direct current generators of the small aircraft, many times more power can be supplied via the alternating current generators of wide-bodied aircraft with the same system weight, for which reason the alternating current system has advantages over the direct current system, particularly for large electrical loads.

In order to also be able to supply direct current via the alternating current generators, so-called rectifiers are attached to the alternating current generators, which, for example, are designed as 3-phase 2-way rectifiers.

Generally, the electrical generation equipment arranged in an aircraft is comprised of one or more electrical apparatuses, which can be operated as a generator. The electrical apparatuses or generators are usually built into the area of an accessory gearbox of an aircraft engine and are propelled via a driveshaft of a jet engine connected to a power plant high-pressure stage. Here, the drive train between the driveshaft and an electrical apparatus or generator of this type is also used to conduct the torque from a starting device to the driveshaft in order to start the jet engine pneumatically or electrically, via a starter generator.

Two different types of generators are utilized to generate electrical energy. A first group comprises so-called variable-speed constant frequency systems, which have a generator, which is driven directly by the power plant. This type of system is designed without a so-called constant speed drive, whereby the generator is powered by an engine speed varying over the operating range of a jet engine and produces different output frequencies. A control unit converts the different frequencies to a constant frequency of preferably 400 hertz.

A second group comprises generators integrated into a constant speed drive, in which the generators, in spite of the varying speeds of the driveshafts of a jet engine, are supplied with a constant input speed in order to generate a required constant frequency of, for example, 400 hertz.

Inter alia, driving the integrated drive generators (IDGs) via an accessory gearbox of an aircraft engine is known, wherein the input speed of the IDG generators varies and is dependent on the engine power output. The constant speed drives typically consist of a mechanical differential gear and transfer the drive power of the aircraft engine or the driveshaft of the aircraft engine in the direction of the IDG generator. The output rotational speed of the differential gear is changed, for example, by two mechanically coupled hydraulic units. Here, this is a pump and a motor. Each section contains a hydraulic swashplate, wherein the pump has an adjustable angle swashplate, whereas the motor is equipped with a fixed swashplate. A corresponding regulator controls the output speed of the constant speed drive via the adjustable swashplate.

To their disadvantage, the control units attached to the variable-speed constant frequency systems and generally built in in the area of an aircraft fuselage and the generators built in in the area of the aircraft engine are characterized by a substantial installation space requirement and a substantial component weight and, in addition, require a cooling system mounted in the area of the airframe, which contributes to a further increase in the weight and the complexity of the airframe.

IDGs are units with a substantial requirement for installation space and a non-negligible overhung moment respectively affecting the design and the connection area of the generator, which requires an appropriate dimensioning of the component strength of the supporting structure of the accessory generator gearbox in order to be able to secure the excess loads appearing in the operation and the potential damage arising during operation. The resulting large component dimensions of an IDG, in turn, result in large external dimensions of the engine nacelle, which increase drag losses and the windage of an aircraft. In addition, the large number of moving mechanical parts in the area of the constant speed drive has an impact on a desired level of reliability, which is, however, undesirable.

The constant speed drive also increases the component weight of an IDG, as well as the loads appearing in operation, which should be braced in the area of the accessory generator gearbox housing, which, in turn, causes an increase in the component dimensions and in the component weight of all associated aircraft engine structures and bearings and ultimately causes an undesirable increase in the fuel consumption of an aircraft engine.

Where the generators are directly connected, rotational irregularities due to operational conditions in the area of the generators also cause shock loading and torque oscillations, which are induced directly into the accessory generator drive train and increase peak loads in operation, which, in turn, require adequate component strength. An adequate adjustment of the generator drive is also required in order to avoid reaction torque in its area. In certain cases, the load application type should be regulated in order to minimize a dynamic impact on the system.

The object of the present invention is to create an aircraft engine characterized by a low component weight and a small installation space requirement and to provide a straight forward method of operating an aircraft engine.

According to the invention, this object has been achieved by an aircraft engine and a method with the characteristics described herein.

The aircraft engine according to the invention is formed with at least one electrical apparatus, which can be driven by a driveshaft in order to generate electrical energy.

In order to be able to supply an aircraft with the aircraft engine with the desired amount of electrical energy, a hydrodynamic torque converter is arranged between the driveshaft and the electrical apparatus, with guide blades, which can be adjusted via a mechanism. This provides a structurally simple and economical means of operating the electrical apparatus with a constant input speed, despite varying input speeds of the driveshaft, whereby, for example, control units for regulating the voltage generated via the electrical apparatus operated as a generator are not required to limit the current and to regulate the frequencies.

The knowledge underlying the invention is that, for hydrodynamic torque converters with adjustable guide blades, the mass flow of the working fluid circulating in the working space can be adjusted or regulated. In the process, the mass flow of the hydraulic fluid present in the working space of the torque converter and the rotational speed of the turbine wheel of the torque converter at the same rotational speed of the impeller becomes smaller, the more the adjustable guide blades restrict or seal the flow channel in the working space. By implication, both the mass flow and the rotational speed of the turbine wheel increase at the same rotational speed of the impeller if the guide blades increasingly release the flow channel in the working space. Consequently, where the input speeds of the impeller vary, it is a simple matter to adjust consistently the output speed of the torque converter or the rotational speed of the turbine wheel at least approximately to the desired extent by appropriate adjustment of the guide blades, in spite of the varying rotational speeds of the impeller.

In comparison with the solutions known in the field, the aircraft engine according to the invention is characterized by a low overall weight and also, in the area of the drive of the electrical apparatus, by lower loads. This results from the fact that, due to the high input speeds of the electrical apparatus, the design of the component dimensions of the hydrodynamic torque converter is advantageously limited as a function of a defined torque. A correlation describing the torque transmission capacity of a hydrodynamic torque converter shows that the rotational speed has a significant impact on a diameter of a hydrodynamic torque converter and hence affects the overall component size and the overall component weight of the jet engine. The feasibility of being able to construct the hydrodynamic torque converter relatively compactly based on the high input speeds of the electrical apparatus contributes to the overall component weight of the jet engine and the respectively operative loads being limited to a desirable amount.

In an advantageous embodiment of the aircraft engine according to the invention, the electrical apparatus can be driven via an accessory generator, with a drive train providing torque, whereby the overall weight of the entire assembly for the generation of electrical energy for an aircraft engine can be reduced and the overhung moment affecting the area of the connecting point of the generator with a supporting structure of the aircraft engine, which has an effect in this area due to the only single-sided connection of the generator to the supporting structure, is reduced and results in decreased loads on the housing and the bearings.

If an impeller of the hydrodynamic torque converter is connected to an output shaft of an accessory generator gearbox, there is no direct mechanical connection between the accessory generator with a drive train providing torque and the electrical apparatus, whereby discontinuities in the torque curve are not transferred, either by the accessory generator with a drive train providing torque in the direction of the generator or in the opposite direction from the generator in the direction of the drive train. Thus, the transfer of undesirable torque fluctuations in the area of the hydrodynamic torque converter is easily attenuated. In addition, overload protection of the system is guaranteed for a limited period via the hydrodynamic coupling between the drive train and the electrical apparatus, which is subject to slippage.

In a further advantageous embodiment of the aircraft engine according to the invention, a turbine wheel of the torque converter is in operative connection with a shaft of the electrical apparatus.

If a coupling mechanism is arranged between the driveshaft and the shaft of the electrical apparatus, via which a drive torque generated by the electrical apparatus operable as a motor can be conducted in the direction of the driveshaft, the aircraft engine according to the invention can be supplied with the desired amount of starting torque independently of the behavior of the hydrodynamic torque converter and can be switched to an engaged operating condition with little control and regulation effort.

In a structurally simple embodiment of the aircraft engine, operable with little effort, the coupling mechanism includes a switch element, via which the hydrodynamic torque converter can be bypassed during a starting sequence performed by means of a drive torque generated by the electrical apparatus of the aircraft engine.

In a development of the aircraft engine, operable with little effort, the switch element of the coupling mechanism is designed as a freewheel arranged between the shaft of the electrical apparatus and the impeller, which connects the shaft and the impeller torque-proof to one another when there is a positive rotational speed difference between the rotational speed of the shaft of the electrical apparatus and the rotational speed of the impeller, while the shaft and the impeller in the area of the freewheel are decoupled from one another where there is a negative rotational speed difference.

Alternately, the switch element of the coupling mechanism can also be designed as a switchable coupling arranged between the shaft of the electrical apparatus and the impeller, by means of which the shaft and the impeller can be connected torque-proof to one another when there is a positive rotational speed difference between the rotational speed of the shaft of the electrical apparatus and the rotational speed of the impeller, while the shaft and the impeller can be decoupled from one another in the area of the switchable coupling where there is a negative rotational speed difference.

Here, the switch element of the coupling mechanism can be designed as a torque converter lock-up clutch.

In further structurally simple and economical embodiments of the aircraft engine according to the invention, an oil circulation of the hydrodynamic torque converter is operatively connected to the oil circulation of the aircraft engine and/or the oil circulation of the electrical apparatus.

If a transmission mechanism is arranged in the power path between the driveshaft and the impeller of the hydrodynamic torque converter, via which a rotational speed of the driveshaft can be transformed into an input speed favorable to the drive of the hydrodynamic torque converter, the hydrodynamic torque converter can be operated in an optimally efficient operating range. This type of transmission can incorporate, for example, two or more spur gears in mesh with one another.

In the method according to the invention for operating the aircraft engine according to the invention, the guide blades are adjusted as a function of the rotational speed of the driveshaft and the rotational speed of the shaft of the electrical apparatus operated as a generator is adjusted via the adjustment of the guide blades, essentially within a predefined rotational speed range. Hence, an electrical supply can easily be provided for an aircraft designed with the aircraft engine according to the invention, without the generator control unit which regulates the output voltage of the electrical apparatus, limits the current and regulates the frequency. Thus, an aircraft can also easily be designed to be lighter and the installation space not to be allocated for the generator control unit can be utilized otherwise.

In an advantageous variation of the method according to the invention, the guide blades of the hydrodynamic torque converter are adjusted to maintain a constant rotational speed of the shaft of the electrical apparatus operated as a generator, as a function of the effective rotational speed of the driveshaft, whereby rotational speed fluctuations of the driveshaft, and hence of the aircraft engine, can be compensated with little control and regulation effort and with a high degree of spontaneity for brief periods of operation.

If the rotational speed of the driveshaft in the area between the driveshaft and the torque converter is operated at a rotational speed level, at which the hydrodynamic torque converter and the electrical apparatus can be operated with a high level of efficiency, both the torque converter and the electrical apparatus can be designed to be relatively small and the aircraft engine according to the invention can be designed as compactly as possible and with a favorable overall weight.

The characteristics described herein are in each case, alone or in any combination, suitable for the development of the object according to the invention.

Further advantages and advantageous embodiments of the aircraft engine according to the invention follow from the present description with reference to the drawings.

Figure 1:
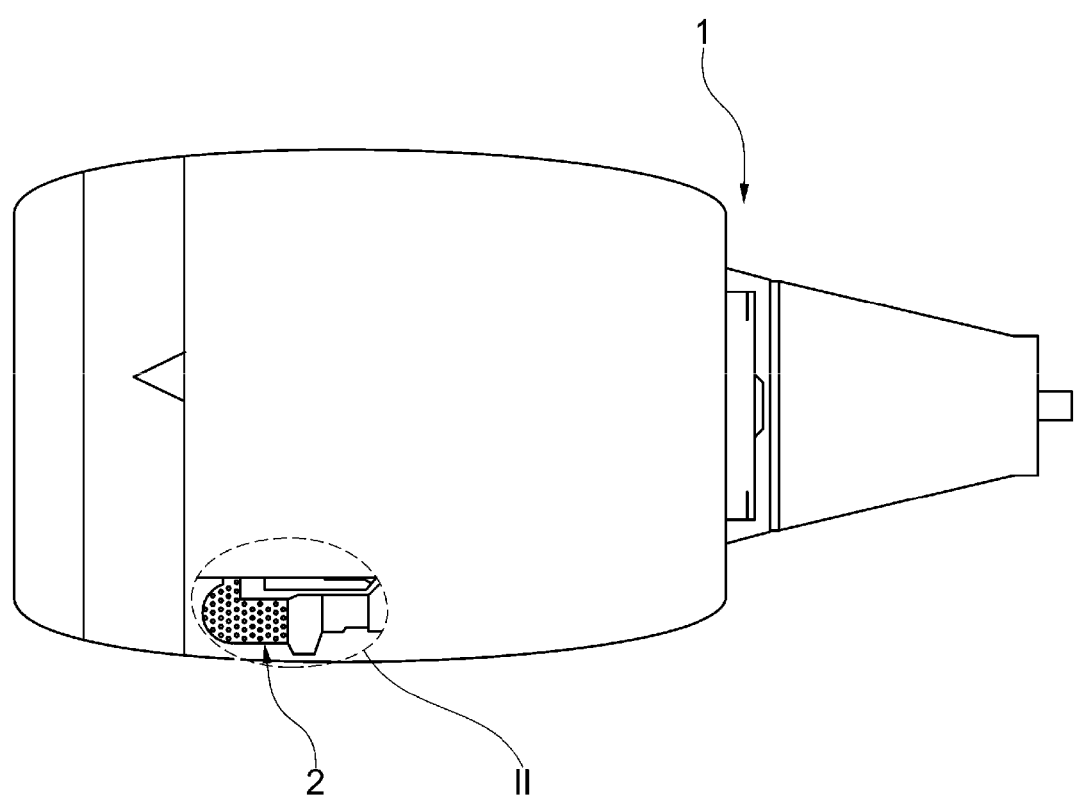
FIG. 1 is a highly schematized profile view of an aircraft engine.
Figure 2:
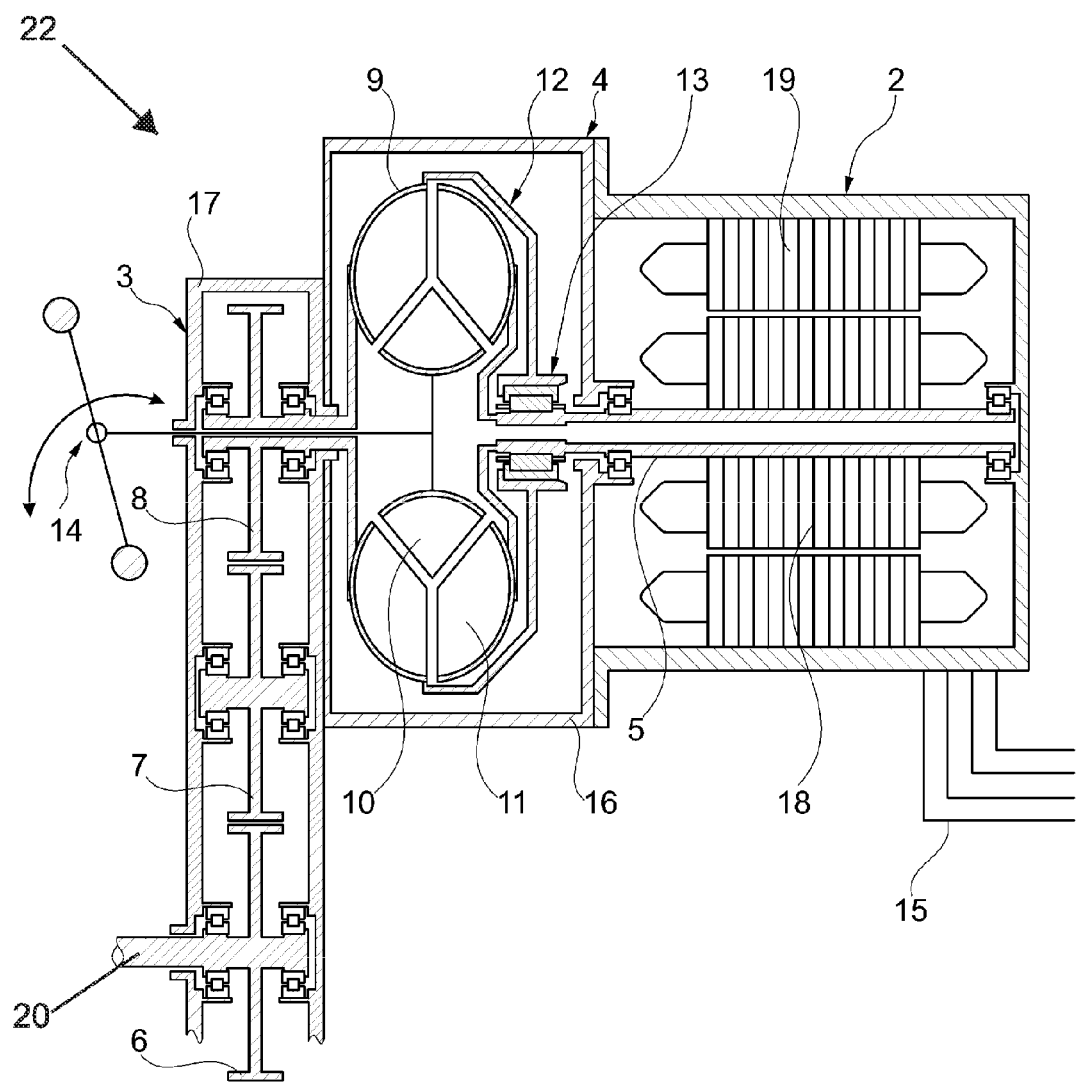
FIG. 2 is an enlarged view of the area II in FIG. 1, labeled in more detail.

FIG. 1 depicts a section view of an aircraft engine 1, which has an electrical apparatus 2 in a lower area for the generation of electrical energy. Here, the electrical apparatus 2 is designed as an alternating current apparatus, which can be operated both as a generator and as a motor, and to which torque can be supplied by a driveshaft 20 (see FIG. 2) of the aircraft engine 1 in order to generate electrical energy in operation as a generator. The driveshaft 20 is connected to a high-pressure turbine of the aircraft engine 1, wherein the torque in the area of the driveshaft can be transferred, in an appropriately altered magnitude, via a transmission 3, depicted in more detail in FIG. 2 and a hydrodynamic torque converter 4 on a shaft 5 of the electrical apparatus 2. Here, the transmission 3 incorporates three spur gears 6 to 8, in mesh with one another. An impeller 9 of the hydrodynamic torque converter 4 is in operative connection with the spur gear 8 and transfers torque in contact with the impeller 9 via the spur gear 8 to a turbine wheel 11 of the hydrodynamic torque converter 4 according to a characteristic of the hydrodynamic torque converter 4 and via a hydraulic fluid and adjustable guide blades 10 in place inside the hydrodynamic torque converter 4, which impeller 9 is connected torque-proof to the shaft 5 of the electrical apparatus 2. The shaft, in turn, is coupled torque-proof to a rotor 18 of the electrical apparatus 2, which works in concert with a stator 19 of the electrical apparatus 2 in the usual manner.

A coupling mechanism 12 is arranged between the impeller 9 of the hydrodynamic torque converter 4 and the shaft 5 of the electrical apparatus 2, which incorporates a switch element 13, via which the hydrodynamic torque converter 4 can be bypassed during a starting sequence performed by means of a drive torque generated by the electrical apparatus 2 of the aircraft engine 1. For this purpose, for example, it can be arranged that the electrical apparatus 2 then operated as a motor is energized by an external power source on a taxiway of an airport and the drive torque required for the aircraft engine is generated, which is then directly conducted to the impeller 9 by the shaft 5 via the switch element 13 on hand, designed as a freewheel, of the coupling mechanism 12 and is conducted from there in the direction of the driveshaft of the aircraft engine 1 via the transmission 3.

For this purpose, the freewheel 13 locks when there is a positive rotational speed difference between the rotational speed of the shaft 5 of the electrical apparatus 2 and the rotational speed of the impeller 9, and connects the shaft 5 and the impeller 9 together torque-proof, while the shaft 5 and the impeller 9 in the area of the freewheel 13 are decoupled from one another when there is a negative rotational speed difference.

The direct mechanical drive on hand in the area of the freewheel 13 on startup provides a significant advantage since the electrical apparatus 2 in operation as a generator can be utilized at maximal rotational speeds and a lower starting torque can be provided via the electrical apparatus 2 while in operation as a motor on starting the aircraft engine 1. Hence, the efficiency of the starting sequence can be improved with an electrical apparatus 2, designed to be both smaller in size and have a lower weight.

In the present case, the guide blades 10 are adjusted via an adjustment mechanism 14 so that, in spite of the varying rotational speed of the driveshaft of the aircraft engine 1, the shaft 5 rotates with an essentially constant rotational speed in order to generate a consistent voltage and a consistent frequency, wherein the electrical energy generated in the area of the electrical apparatus 2 during operation as a generator is transmitted via wiring 15 to electrical loads in the area of an aircraft provided with the aircraft engine.

The gear ratio of the transmission 3 and the resulting rotational output speed of the hydrodynamic torque converter 4 are selected as a function of the efficiency of the hydrodynamic torque converter 4 and the characteristics of the rotational speed ratios, wherein the transmission 3 is actually a part of a gearbox of an accessory generator 22 of the aircraft engine 1. In order to generate electrical energy via the electrical apparatus 2, the impeller 9 should be operated with a higher rotational speed than the turbine wheel 11 since only in this case can torque be transmitted from the driveshaft of the aircraft engine in the direction of the electrical apparatus 2 via the hydrodynamic torque converter 4. The output speed of the hydrodynamic torque converter 4 or the rotational speed of the turbine wheel 11 should be adjusted within a narrow operational rotational speed range in order to meet the requirements of the electrical system or the electrical apparatus 2. Since the input speed of the aircraft engine 1 varies in the high-pressure area, the rotational speed of the turbine wheel 12 should be adjusted by adjusting the guide blades 10 to the required value. The required input signals are provided for the adjustment mechanism 14 by a control system of the aircraft engine 1 in order to modify the current position of the guide blades 10 accordingly, as a function of the change in the input speed of the driveshaft of the aircraft engine 1.

Accordingly, the characteristics of the hydrodynamic torque converter 4 are designed in order to be able to operate the electrical apparatus with a high degree of efficiency over the entire rotational speed range of the aircraft engine 1. The operative connection between the shaft 5 and the impeller 9 in the area of the coupling mechanism 12 or in the area of the freewheel 13 is detached while operating the electrical apparatus 2 as a generator, whereby the impeller 9 and the shaft 5 rotate independently of one another.

In starting mode, torque is conducted in the direction of the driveshaft of the aircraft engine 1 by the electrical apparatus 2 in order to accelerate the driveshaft of the high-pressure area of the aircraft engine 1 to the starting rotational speed required for the starting sequence of the aircraft engine 1. When the electrical apparatus 2 is in this operational condition, the freewheel 13 connects the shaft 5 torque-proof to the impeller 9, whereby the hydrodynamic torque converter 4 is bypassed. When the aircraft engine 1 is in the engaged position, the hydrodynamic torque converter 4 is supplied with hydraulic fluid and, in turn, the impeller 9 is accelerated by the driveshaft of the aircraft engine 1, whereby the freewheel 13 is disengaged.

The hydrodynamic torque converter 4 can either be integrated into an accessory generator 22 of the aircraft engine 1, with a drive train providing torque, and supplied via the oil system of the aircraft engine 1, or can be arranged in the area of the electrical apparatus 2, in which, in solutions known in the field, the so-called constant speed drive (CSD) is typically arranged. With the latter arrangement of the hydrodynamic torque converter 4, this can be provided via the oil system of the electrical apparatus 2. The connection to one of the oil systems is required in order to supply hydraulic fluid or oil, which is the medium for the transfer of the torque. Depending on the oil system selected, the oil is cooled via the respective cooler of the system involved.

As depicted in the drawing, the electrical apparatus 2 is only attached to a supporting structure 16 of the aircraft engine 1 in the area of the section facing the hydrodynamic torque converter 4, whereby a resulting overhung moment always has an effect on the section of the electrical apparatus 2 attached to the supporting structure 16, depending on the component weight of the electrical apparatus 2. The high rotational speeds of the electrical apparatus 2 provide the option of designing or creating the hydrodynamic torque converter 4 with small component dimensions for a resulting defined torque. The equation describing the torque transmission capability of the hydrodynamic torque converter 4 shows that the rotational speed has a significant impact on the diameter of a hydrodynamic torque converter and hence on the overall dimensions and the overall weight of the unit featuring the electrical apparatus 2, the hydrodynamic torque converter 4 and the transmission 3. Hence, the overall weight of the unit, the overhung moment affecting the area of the supporting structure 16 and the attachment section of the supporting structure 16 on the transmission 3, the load in the area of the housing 17 of the accessory generator gearbox 3, and the bearing loads are low.

As a result of the hydrodynamic torque converter being able to be integrated into the accessory generator with a drive train providing torque, it is also possible to minimize the overhung moment and the weight of the electrical apparatus 2 of the hydrodynamic torque converter 4 and of the transmission 3 as much as possible. In addition, the torque characteristics of the hydrodynamic torque converter 4 can be adjusted so that these are optimally adapted to defined variants and rotational speed ranges of the aircraft engine 1 in order to guarantee low levels of power loss and minimal heat generation.

In turn, in comparison with the aircraft engines designed with constant speed drives known to date, the reduced number of components owing to the use of the hydrodynamic torque converter 4 provides a straightforward option of improving the reliability of the entire unit. In addition, unlike for aircraft engines, which are designed with conventional constant speed drives, for the aircraft engine 1 described above, certain rotational speed ranges of the aircraft engine 1 need not be avoided.

LIST OF REFERENCE NUMERALS

1 Aircraft engine
2 Electrical apparatus
3 Transmission
4 Hydrodynamic torque converter
5 Shaft of the electrical apparatus
6 to 8 Spur gear
9 Impeller of the hydrodynamic torque converter
10 Adjustable guide blades of the hydrodynamic torque converter
11 Turbine wheel of the hydrodynamic torque converter
12 Coupling mechanism
13 Switch element
14 Adjustment mechanism
15 Wiring
16 Supporting structure
17 Transmission housing
18 Rotor of the electrical apparatus
19 Stator of the electrical apparatus

The invention claimed is:

1. An aircraft engine comprising:
a driveshaft;
an electrical apparatus, driven by the driveshaft, to generate electrical energy,
a hydrodynamic torque converter with adjustable guide blades arranged between the driveshaft and the electrical apparatus;
an adjustment mechanism for adjusting a position of the guide blades;
a coupling mechanism arranged between the driveshaft and a shaft of the electrical apparatus, via which a drive torque generated by the electrical apparatus when operated as a motor can be supplied in a direction of the driveshaft;
wherein the coupling mechanism includes a switch element, via which the hydrodynamic torque converter can be bypassed during a starting sequence performed by the drive torque generated by the electrical apparatus.

2. The aircraft engine in accordance with claim 1, wherein the electrical apparatus can be driven via an accessory generator with a drive train providing the torque.

3. The aircraft engine in accordance with claim 1, and further comprising:
a transmission mechanism having an output shaft,
wherein the hydrodynamic torque converter further includes an impeller,
wherein the transmission mechanism is arranged between the driveshaft and the impeller,
wherein the impeller is connected to the output shaft.

4. The aircraft engine in accordance with claim 3, wherein the hydrodynamic torque converter includes a turbine wheel and the turbine wheel is in operative connection with the shaft of the electrical apparatus.

5. The aircraft engine in accordance with claim 3, wherein an oil circulation of the hydrodynamic torque converter is operatively connected to an oil circulation of the electrical apparatus.

6. The aircraft engine in accordance with claim 1, wherein the switch element of the coupling mechanism is a freewheel arranged between the shaft of the electrical apparatus and the impeller, which connects the shaft and the impeller torque-proof to one another when there is a positive rotational speed difference between a rotational speed of the shaft of the electrical apparatus and a rotational speed of the impeller, while the shaft and the impeller in an area of the freewheel are decoupled from one another when there is a negative rotational speed difference.

7. The aircraft engine in accordance with claim 6, wherein an oil circulation of the hydrodynamic torque converter is operatively connected to an oil circulation of the electrical apparatus.

8. The aircraft engine in accordance with claim 1, wherein the switch element of the coupling mechanism is a torque converter lock-up clutch.

9. The aircraft engine in accordance with claim 1, wherein an oil circulation of the hydrodynamic torque converter is connected to an oil circulation of the aircraft engine.

10. The aircraft engine in accordance with claim 1, wherein an oil circulation of the hydrodynamic torque converter is operatively connected to an oil circulation of the electrical apparatus.

11. A method of operating an aircraft engine, comprising:
providing an aircraft engine comprising:
a driveshaft;
an electrical apparatus including a shaft, driven by the driveshaft, to generate electrical energy,
a hydrodynamic torque converter with adjustable guide blades arranged between the driveshaft and the shaft of the electrical apparatus,
an adjustment mechanism for adjusting a position of the guide blades,
adjusting the guide blades as a function of a rotational speed of the driveshaft, and
adjusting a rotational speed of the shaft of the electrical apparatus when operated as a generator within a predefined rotational speed range via the adjusting of the guide blades.

12. The method in accordance with claim 11, and further comprising adjusting the guide blades to comply with a constant rotational speed of the shaft of the electrical apparatus operated as a generator as a function of an effective rotational speed of the driveshaft.

13. The method in accordance with claim 12, and further comprising reducing the rotational speed of the driveshaft in an area between the driveshaft and the torque converter to a level of rotational speed at which the hydrodynamic torque converter and the electrical apparatus can be operated with a high level of efficiency.

14. The method in accordance with claim 11, and further comprising reducing the rotational speed of the driveshaft in an area between the driveshaft and the torque converter to a level of rotational speed at which the hydrodynamic torque converter and the electrical apparatus can be operated with a high level of efficiency.

15. An aircraft engine comprising:
a driveshaft;
an electrical apparatus, driven by the driveshaft, to generate electrical energy,
a hydrodynamic torque converter with adjustable guide blades arranged between the driveshaft and the electrical apparatus;
an adjustment mechanism for adjusting a position of the guide blades;
wherein an oil circulation of the hydrodynamic torque converter is connected to an oil circulation of the aircraft engine.

16. An aircraft engine comprising:
a driveshaft;
an electrical apparatus, driven by the driveshaft, to generate electrical energy,
a hydrodynamic torque converter with adjustable guide blades arranged between the driveshaft and the electrical apparatus;
an adjustment mechanism for adjusting a position of the guide blades;
wherein an oil circulation of the hydrodynamic torque converter is operatively connected to an oil circulation of the electrical apparatus.

\* \* \* \* \*